United States Patent [19]

Shirley, Jr.

[11] Patent Number: 4,650,682

[45] Date of Patent: Mar. 17, 1987

[54] ACIDIFIER-AMMONIATOR

[75] Inventor: Arthur R. Shirley, Jr., Florence, Ala.

[73] Assignee: Agro-Systems Inc., Muscle Shoals, Ala.

[21] Appl. No.: 469,134

[22] Filed: Feb. 23, 1983

[51] Int. Cl.$^4$ ............................................. A23K 1/22
[52] U.S. Cl. ..................................... 426/69; 426/626; 426/636; 426/807; 71/40; 71/42; 71/43; 422/209
[58] Field of Search .................. 426/453, 626, 807, 69, 426/636; 71/37, 42, 43, 40; 422/209

[56] References Cited

U.S. PATENT DOCUMENTS

| Re. 26,263 | 9/1967 | Madrazo et al. | 426/626 |
|---|---|---|---|
| 2,729,554 | 1/1956 | Nielsson | 422/209 |
| 2,741,545 | 4/1956 | Nielsson | 422/209 |
| 2,885,279 | 5/1959 | Mortenson | 71/37 X |
| 2,924,513 | 2/1960 | Altimier et al. | 422/209 |
| 2,945,747 | 7/1960 | Nielsson | 422/209 |
| 2,946,666 | 7/1960 | Eymann | 422/209 |
| 3,034,883 | 5/1962 | Hignett et al. | 422/209 |
| 3,178,267 | 4/1965 | Larson | 422/209 |
| 3,241,945 | 3/1966 | Sanders et al. | 71/37 X |
| 3,285,704 | 11/1966 | Sackett | 422/209 |
| 3,362,809 | 1/1968 | Tucker | 422/209 |
| 3,397,036 | 8/1968 | Narins et al. | 71/37 X |
| 4,048,341 | 9/1977 | Lagerstrom et al. | 426/807 X |
| 4,082,859 | 4/1978 | Katzen | 426/626 X |
| 4,182,780 | 1/1980 | Lagerstrom et al. | 426/807 X |
| 4,261,816 | 4/1981 | Beck et al. | 426/807 X |

Primary Examiner—R. B. Penland
Attorney, Agent, or Firm—Cushman, Darby & Cushman

[57] ABSTRACT

Apparatus and process for chemically treating particulate solids material in free flowing condition with fluid reactants in a drum reactor having an acidifying chamber in which acid is introduced into the solids material and an ammoniation chamber in which ammonia is introduced into the solids material.

13 Claims, 6 Drawing Figures

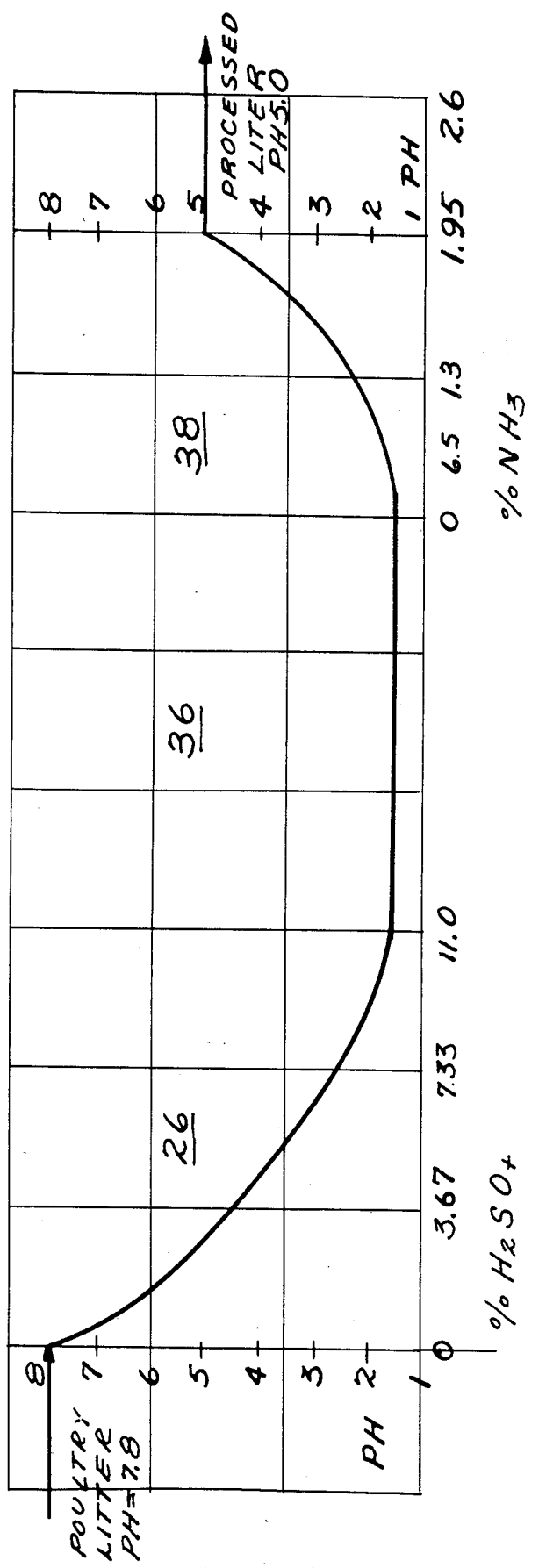
Fig. 6. PH CURVE FOR PROCESS DRUM

ACIDIFIER-AMMONIATOR

This invention relates to a rotary drum chemical reactor and processes carried out therein and in particular to a reactor for contacting particulate solid material passing through the drum with different reactants in series. More particularly the drum reactor is constructed to have an acidifying chamber in which acid is introduced into the material and an ammoniation chamber in which ammonia is introduced into the material.

BACKGROUND AND SUMMARY OF THE INVENTION

Rotary drum reactors are not new in a broad sense. They are used, for example, in the production of granular phosphate fertilizers. In these reactors phosphoric acid and ammonia are injected simultaneously into a tumbling or rolling bed of granular fertilizer within the drum, and reaction between the acid and the ammonia occurs within the bed.

The present invention provides a rotary drum reactor which effects sequential reaction of the material with different reactants. The reactants are typically acid and ammonia and these terms are used throughout this description. The construction and operation of the drum reactor is not, however, restricted to the use of these two reactants. The manner of contacting the particulate material with the acid and with the ammonia permits close control of the reactions to obtain a product of desired composition. This feature has general utility in various reactions and special utility in the conversion of poultry litter into a feed supplement for ruminant animals. By sequencing the acidifcation and ammoniation steps, it is possible to control the acid reaction independently of the ammoniation. The acid reaction may be only an impregnation of the particulate material with the acid or it may include various chemical and physical reactions between the acid and the material. In either case the special manner of contacting the acid with the material assures rapid and uniform contact between the two. This is of particular importance in reactions, such as the acidification of poultry litter, where it is desired to rapidly reduce the pH of the particulate material to a predetermined level. The ammonia is then introduced into the acidified mass in a manner to react therewith rapidly so that no or essentially no free ammonia is present in the atmosphere within the drum.

In one particularly useful construction the means for introducing the ammonia is longitudinally spaced in a downstream direction (with respect to the direction of travel of the particulate material) in order to provide an intermediate chamber for extending the reaction time between the acid and the material as the latter travels through the intermediate chamber. It is contemplated, however, that the acidifying chamber and the ammoniation chamber can overlap to an extent so that both acid and ammonia will contact the material simultaneously during a portion of its passage through the drum.

The desired rapid and uniform contact between acid and particulate material in the acidifying chamber of the drum is accomplished by spraying the acid in finely atomized form onto a thin, free-falling stream or curtain of the particulate material. The stream or curtain is formed by internal lifting flights which lift the material such that it cascades downwardly upon sliding from the flights. The stationary acid spray nozzles are located at spaced intervals along the length of the chamber and are so arranged that the downwardly falling particles pass in front of the nozzle orifices. Thus acid is sprayed on free-flowing material and is not sprayed directly onto the wall of the chamber of directly onto the bulk material being carried by the flights. The manner in which the flights are canted insures good mixing without buildup or reverse flow problems. Preferably the flights are canted (relative to a plane passing through the axis of the drum) in a direction opposite the direction of rotation of the drum. A particularly suitable angle is about 45°. The width (height) of the flights should generally between 10% and 20% of the diameter of the drum, causing them to effectively decrease the retention time of the material in the chamber with respect to the subsequent chambers because a lot of the space underneath the flights remains essentially empty during operation. By maintaining a highly active but thin bed, good mixing of the particulate material occurs, resulting in extremely uniform acidulation.

In the ammoniation chamber the particulate material is in the form of a tumbling bed in contact with the wall of the drum, inasmuch as there are no lifting flights in this chamber. The ammonia is introduced from stationary discharge orifices located within the bed near the lower end of the bed so that the ammonia has the maximum time to disperse into the bed before being exposed to the surface of the bed or being brought near the surface of the bed. With proper control of the input of ammonia this arrangement assures that there is little or no ammonia in the atmosphere in the ammoniation chamber. Preferably the points of injection of ammonia are spaced from the wall of the drum no more than about ⅓ of the depth of the bed.

BRIEF DESCRIPTION OF THE DRAWINGS

FIG. 6 is a pH profile of the drum illustrating the pH of a typical reaction mixture along the length of the drum.

DETAILED DESCRIPTION

Figure 3:
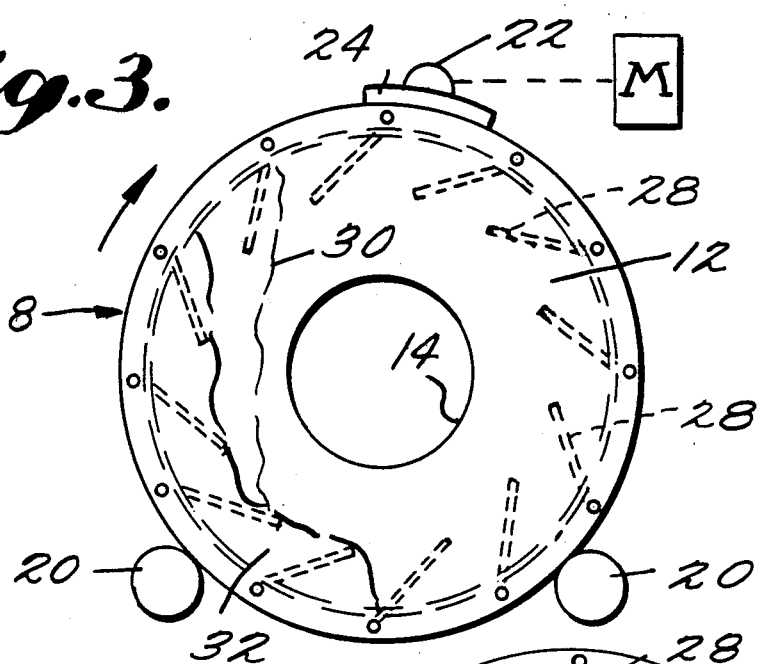
FIG. 3 is an end view of the inlet end of the drum looking in the direction of arrows 3—3 of FIG. 1.
Figure 4:
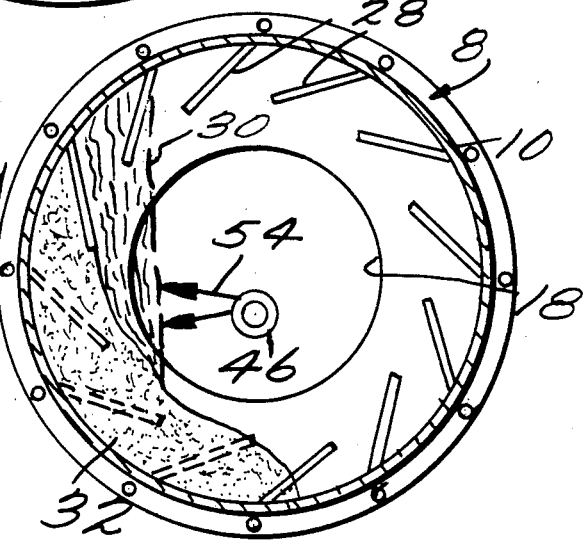
FIG. 4 is a schematic sectional view taken on the line 4—4 of FIG. 1.

The drum reactor 8 includes a cylindrical side wall 10, an inlet end plate 12 having an axial opening 14 and an outlet end plate 16 having an axial discharge opening 18. The drum 8 is supported and rotatably driven in any conventional fashion and is slightly inclined downwardly toward its discharge end so that particulate material introduced through the inlet opening by a chute 19 will travel through the drum 8 and be discharged through the discharge opening 18. As illustrated schematically in FIG. 3 the drum 8 can be supported on rollers 20 and rotatably driven by a motor M through a pinion 22 which engages a ring gear 24 secured to the drum side wall 10.

Particulate material entering the drum 8 enters a first drum portion or chamber 26 in which it will be acidified. This acidifying chamber is fitted with lifting flights 28 secured to the drum side wall 10. The flights 28 are canted in a direction opposite the direction of rotation of the drum 8, relative to an axial plane passing through the axis of the drum. A particularly suitable cant angle is 45°. Upon rotation of the drum the flights 28 lift the particulate material in the chamber 26 and drop it so that it falls and cascades as a stream or curtain 30. The bulk of the material rolls as a mass 32 on the inner surface of the side wall 10. The manner in which the flights 28 are canted insures good mixing of the material without buildup or reverse flow problems. The width of the flights 28 should be between 10 and 20% of the drum's diameter.

The length of the flights 28 is the same as the length of the chamber 26, in that the downstream ends of the flights 28 form the downstream end of the chamber 26. At the ends of the flights 28 there is a ring 34 secured to the drum side wall. Particulate material passing over this ring 34 enters an intermediate chamber 36 which free of lifting flights. The intermediate chamber 36 may be axially longer or shorter than shown or it may be omitted.

Figure 5:
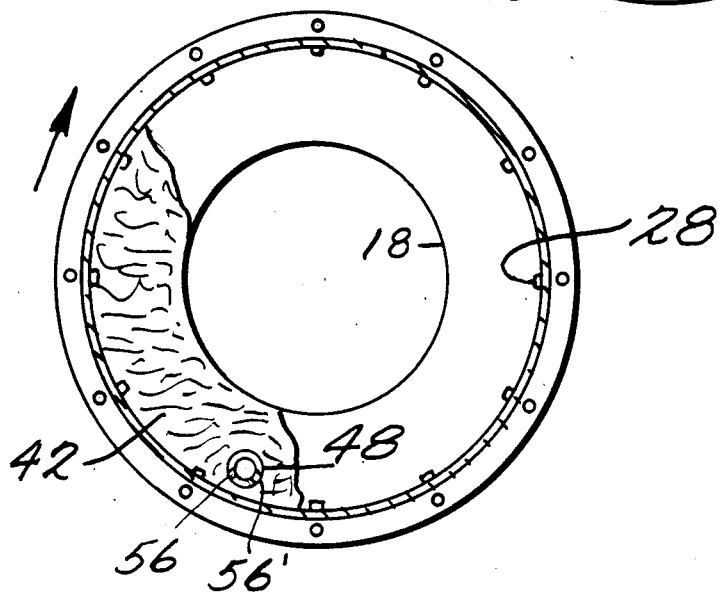
FIG. 5 is a schematic sectional view taken on the line 5—5 of FIG. 1.

Downstream of the intermediate chamber 36 is an ammoniation chamber 38 which in the illustrated embodiment is fitted with antiskid strip 40 extending essentially the length of the chamber 38. The strips 40 may be approximately ¼ to ½ inch in height to prevent the bed 42 of particulate material from slipping in the chamber 38. As seen in FIG. 5 the bed 42 is a rolling bed of material in contact with the side wall 10, since the strips 40 are too low to function as lifting flights.

Figure 2:
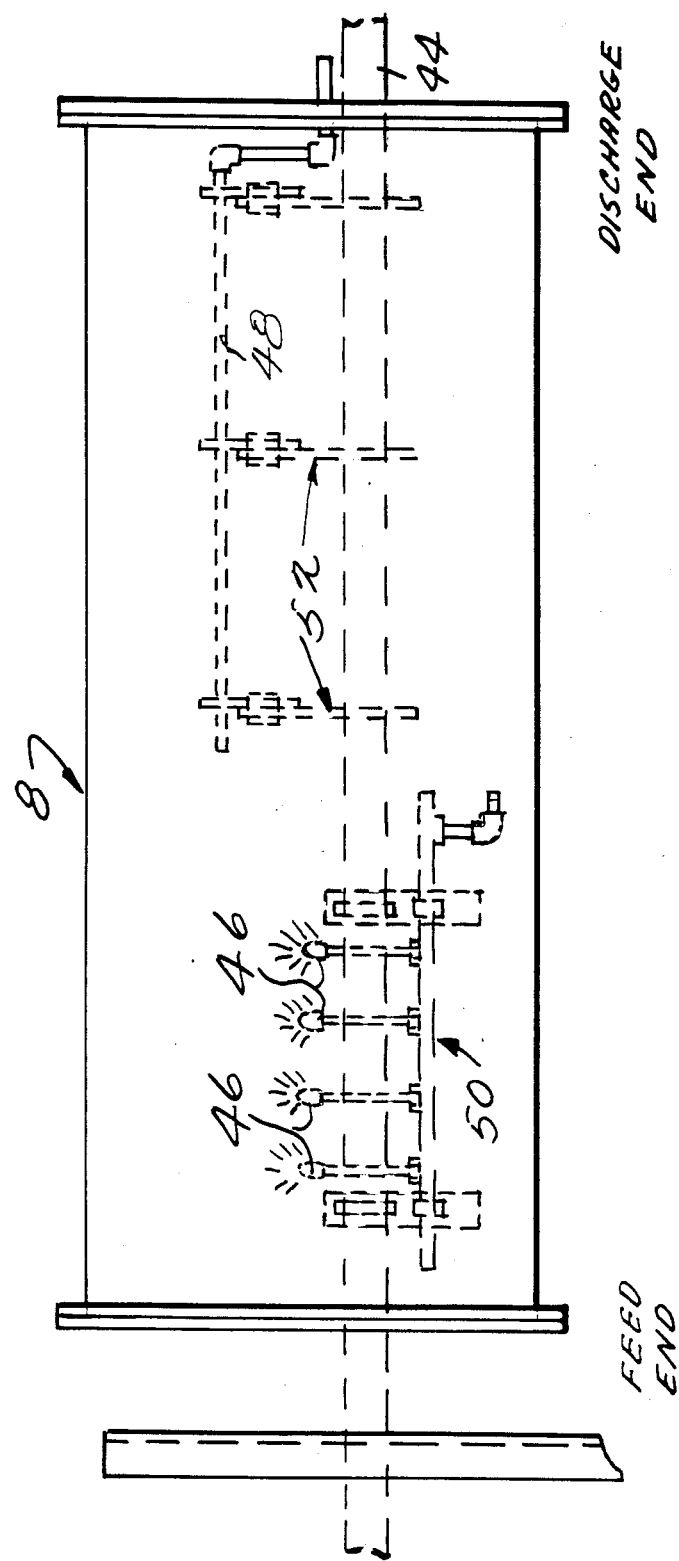
FIG. 2 is a plan view of the reactor of FIG. 1 illustrating in phantom lines the locations of the acid injection inlets and the ammonia injection inlets.

Extending axially through the drum 8 is a stationary pipe 44 (FIG. 2) supported outside the drum by any suitable means (not shown). The support pipe 44 has been omitted from the other views in the interest of clarity. The pipe 44 is provided as a support structure for a plurality of acid injector nozzles 46 in the acidification chamber 26 and as a support structure for an ammonia sparge pipe 48 in the ammoniation chamber 38. The manner in which the nozzles 46 and the sparge pipe 48 are mounted on the support pipe 44 forms no part of the invention and need not be described. The mounting means for the nozzles 48 is shown generally at 50, and the mounting means for the sparge pipe 48 is shown generally at 52.

The acid spray nozzles 48 are disposed in spaced apart relationship along essentially the whole of the length of the acidification chamber 26. The nozzles are so located that their discharge orifices are aimed at the curtain 30 of free-falling material so that the sprayed acid 54 contacts the curtain 30 near its lower end. The location of the ammonia sparge pipe 48 is within the bed 42 of particulate material in the ammoniation chamber 38 near the lower end of the bed 42 so that ammonia injected from orifices 56 in the pipe 48 has the maximum time to disperse and react with the acidulated particulate material before being exposed to the surface of the bed. The distance of the orifices 56 from the wall of the drum should be no greater than ½ the depth of the bed 42. The diameter of the discharge aperture 18 is such that, typically, a bed depth of about 10 inches exists in the chamber 38.

FIG. 6 illustrates a pH profile for a typical acidificationammoniation reaction carried out on particulate poultry litter in a drum constructed according to the present invention.

Figure 1:
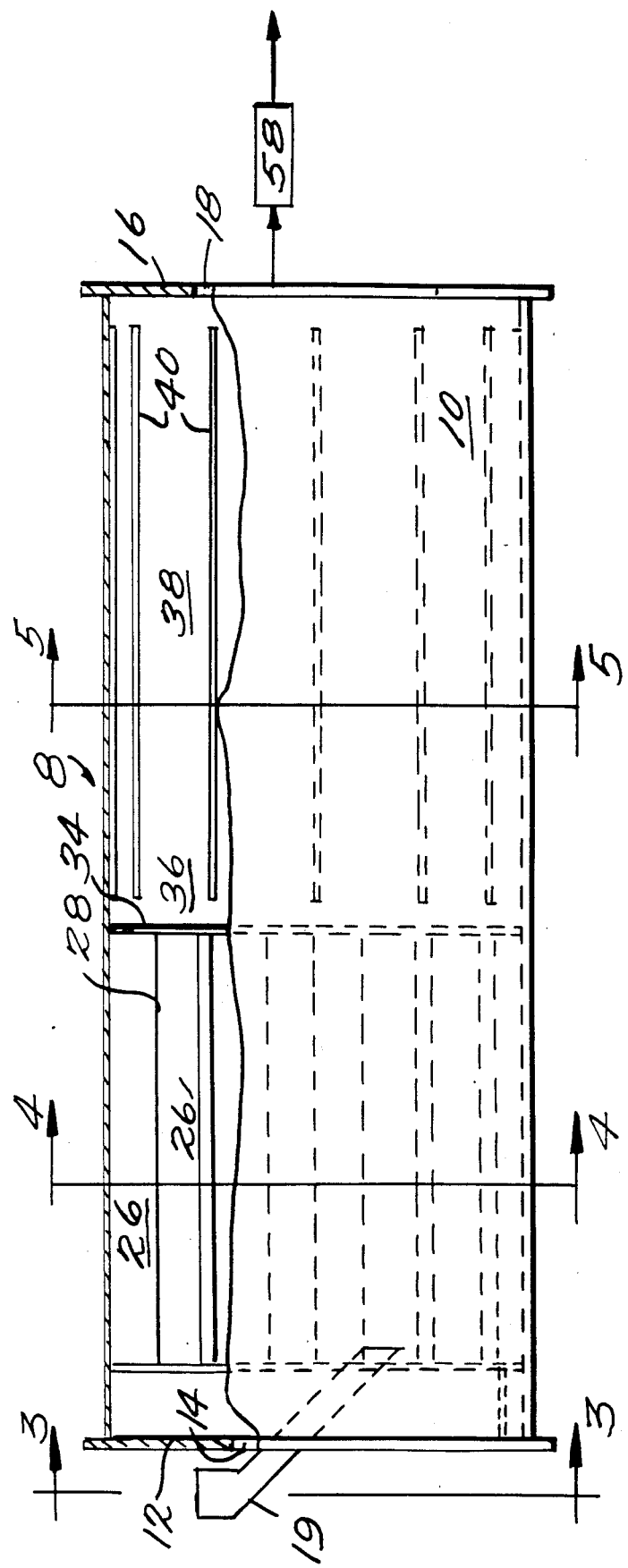
FIG. 1 is a schematic side elevational view, partly broken away of an acidifier-ammoniator rotary drum reactor emboding the principles of the present invention, with some parts omitted for clarity.

As shown, the pH of the litter drops rapidly in the acidification chamber 26 as the litter progresses through that chamber while being sprayed with finely atomized concentrated sulfuric acid. In the intermediate chamber 38, which serves as a retention chamber, the pH remains constant. In the ammoniation chamber 38 the pH rapidly rises as the acidified litter is sparged with anhydrous gaseous ammonia. The overall treatment process produces a product suitable as a feed supplement for ruminant animals. The acidification step traps free ammonia which is present in the litter, stabilizes other nitrogen compounds, destroys odor producing compounds and partially hydrolyzes the lignocellulose content of the litter to make it more digestible to ruminants. The ammoniation step produces an ammonium salt by reaction with the acid and partially neutralizes the acidified litter. The chemical reaction increases the temperature of the litter and drives off water vapor so that an essentially dry particulate product is formed. Air is preferably drawn axially through the drum 8 by any suitable means, illustrated schematically at 58 in FIG. 1.

What is claimed is:

1. Apparatus for treating particulate solid material in free-flowing condition with at least two fluid reactants comprising: a rotary drum having a first longitudinal portion of its length fitted with internal lifting flights extending essentially the whole of the length of said first drum portion for lifting and dropping particulate material in the form of a falling stream which extends essentially the whole of the length of said first drum portion, said drum also having a second longitudinal portion of its length free of lifting flights to thereby form particulate material into a tumbling bed; a plurality of reactant spray nozzle means in and spaced apart along the length of said first drum section and having outlets facing said lifting flights so located as to spray a first fluid reactant supplied thereto onto the falling stream of particulate material; and injection means located in said second portion, said injection means being so located as to inject a second fluid reactant into the tumbling bed at a location within the bed.

2. Apparatus as in claim 1 wherein said lifting flights are canted in a direction opposite to the direction of rotation of said drum, relative to a plane passing through the axis of said drum.

3. Apparatus as in claim 2 wherein said lifting flights are canted at an angle of 45°.

4. Apparatus as in claim 1 including an intermediate longitudinal drum portion between said first and second portions, said intermediate portion being free of reactant injection means.

5. Apparatus for sequentially acidifying and ammoniating particulate solid material in free-flowing condition comprising: a rotary drum having a cylindrical side wall, an upstream end and a downstream end and having at said upstream end a first longitudinal portion of its length fitted with internal lifting flights extending essentially the whole of the length of said first drum portion for lifting and dropping particulate material in the form of a falling stream which extends essentially the whole of the length of said first drum portion; means for spraying acid onto essentially the entire length of the falling stream of particulate material, said means including a plurality of spray nozzles spaced apart along the length of said first drum portion and facing said lifting flights whereby the falling stream passes in front of the nozzles; said drum having at its downstream end a second longitudinal portion free of lifting flights for receiving particulate material from said first drum portion and for forming such material into a tumbling bed; means for ammoniating the tumbling bed of particulate material, said means including at least one gaseous ammonia injection nozzle located in a lower portion of said second drum portion so as to lie within the tumbling bed; and means for passing a stream of air through said drum from said upstream end to said downstream end.

6. Apparatus as in claim 5 wherein said lifting flights are canted in a direction opposite to the direction of drum rotation, at an angle of about 45°.

7. A process for treating particulate solid material in free-flowing condition with at least two fluid reactant materials comprising: passing the particulate material into a first longitudinal portion of a rotating drum having a cylindrical side wall, said drum being arranged so as to move the material from said first portion to a second longitudinal drum portion upon rotation of the drum; creating in said first drum portion a downwardly falling stream of the particulate material by means of lifting flights provided on the inner surface of the side wall of said first drum portion, said lifting flights and said falling stream extending essentially the entire length of said drum portion and said falling stream having a surface which faces radially inward with respect to said drum; spraying a first fluid reactant in a radially outward direction onto essentially the entire longitudinal length of the falling stream in a manner such that essentially all of the fluid is sprayed directly onto the falling particulate matter; creating in said second drum portion a tumbling bed of the particulate material which has passed from said first drum portion into said second drum portion, said bed being in contact with the drum wall and said bed having an upper end and a lower end; and introducing a second fluid reactant into said bed from at least one injection orifice located so as to be continuously embedded in said bed.

8. A process as in claim 7 wherein injection of said second reactant takes place near the lower end of said bed.

9. A process as in claim 7 wherein injection of said second reactant takes place at a distance from the drum wall which is no greater than one third of the thickness of the bed.

10. A process as in claim 7 including drawing a stream of air axially through said drum.

11. A process as in claim 7 wherein the reactions in said drum portions generate heat and water and wherein the process is controlled so as to utilize the heat to drive off water vapor and thereby dry the particulate material in said second drum portion.

12. A process for sequentially acidifying and ammoniating particulate solid material in free-flowing condition comprising: passing the particulate material into a first longitudinal portion of a rotating drum having a cylindrical side wall, said drum being arranged to move the material from said first longitudinal portion to a second longitudinal portion upon rotation of the drum; creating in said first drum portion, by means of lifting flights on the inner surface of the side wall, a downwardly falling stream of the particulate material extending essentially the entire length of said first drum portion, said falling stream having a surface which faces radially inward with respect to the drum; directing a spray of acid in a radially outward direction into essentially the entire longitudinal length of said surface of said falling stream; creating in said second drum portion a tumbling bed of the acidified particulate material which has passed from said first drum portion into said second drum portion; introducing gaseous ammonia into said bed, from at least one injection orifice located so as to be continuously embedded in said bed, in an amount to react with the acidified material so that essentially no free ammonia is present in the atmosphere in said second drum portion and so that the resulting neutralization reaction increases the temperature of the material and drives off water vapor; and discharging the resulting essentially dry particulate matter from said second drum portion.

13. A process as in claim 12 including passing a stream of air through the drum in a direction co-current with the direction of movement of the particulate material.

* * * * *